United States Patent

[11] 3,591,100

[72] Inventors Fukuzo Itoh
Yokohama-shi;
Masaoki Sekine, Kawasaki-shi; Kohsuke Arai, Tokyo, all of, Japan

[21] Appl. No. 859,666
[22] Filed Sept. 22, 1969
[45] Patented July 6, 1971
[73] Assignee Tokyo Denki Kagaku Kogyo Co., Ltd., Chiyoda-Ku, Tokyo, Japan
[32] Priority Sept. 26, 1968
[33] Japan
[31] 43/69073

[54] ENDLESS TAPE CASSETTE
3 Claims, 2 Drawing Figs.

[52] U.S. Cl. ........ 242/55.19
[51] Int. Cl. ........ B65h 17/48
[50] Field of Search ........ 242/55.17-—55.21, 197—201

[56] References Cited

UNITED STATES PATENTS

| | | | |
|---|---|---|---|
| 2,732,754 | 1/1956 | Foster et al. | 242/198 |
| 3,059,871 | 10/1962 | Loewe | 242/198 |
| 3,066,880 | 12/1962 | Bauer | 242/198 |
| 3,426,976 | 2/1969 | Maxey | 242/189 |
| 3,406,923 | 10/1968 | Wolfner | 242/55.19 |

*Primary Examiner*—Leonard D. Christian
*Attorney*—Wenderoth, Lind and Ponack

ABSTRACT: A cassette having two axis holes to receive two spindles of a tape recorder. A rotating plate having a hub fits over the first spindle. The endless tape is wound around the hub to form an endless reel. A U-shaped checking lever having two legs is pivoted to the cassette casing at a point closer to one leg than the other. One leg has a pawl on its end for engaging cogs around the periphery of the rotating plate. The other leg has a tapered undersurface which cooperates with a tapered edge of the second spindle. A spring biases the lever to engage the pawl and cogs.

FUKUZO ITOH,
MASAOKI SEKINE and
KOHSUKE ARAI,

INVENTORS

BY Wenderoth, Lind & Ponack

ATTORNEYS

ENDLESS TAPE CASSETTE

BACKGROUND OF THE INVENTION

The present invention relates to a cassette, or cartridge, of magnetic tape for use with a tape recorder. More specifically, the present invention relates to such a device which employs the use of endless magnetic tape and which further avoids damage to the tape when the cassette is put on or removed from the tape recorder.

An endless tape is normally wound around a hub in an endless reel with the innermost surface of the tape contacting the peripheral edge of the hub. This inner end of the tape is continually drawn out to pass over a recording head. From the recording head, the tape returns to and is rewound around the hub.

When a cassette employing such an endless tape is put on or removed from a tape recorder which is mistakenly operating in a direction reverse to that mentioned above, the endless tape tends to be forced into the space between the hub and the inner part of the reel. But, this space is inadequate, and causes the tape to jam. In some cases, the tape is seriously damaged. Prior art attempts to solve this problem have not been entirely successful.

With this problem in mind it is an object of this invention to provide a cassette using an endless magnetic tape wherein the tape is prevented from being damaged when the cassette is placed on or removed from a tape recorder.

It is a further object of this invention to provide such a cassette that may be used on a conventional tape recorder adapted for use with both takeup and play-out reels.

These objects are accomplished by the use of a cassette having a casing with two axis holes. One hole received a first rotating spindle of a tape recorder which operates as the actuating rod of the cassette. On the rod is positioned a rotating plate having a hub around which the endless tape is wound. The other hole receives a second spindle, which may be either rotating or stationary, of a tape recorder which operates as the holding pin of the cassette. Above the other hole is positioned a first leg of a generally U-shaped checking lever pivotally mounted on the casing. The second leg of the lever has a pawl thereon which mates with cogs on the periphery of the rotating plate to check rotation thereof. The under surface of the first leg of the lever is tapered to cooperate with a tapered edge of the holding pin. If the holding pin rotates, the first leg of the lever is moved, whereby the lever pivots and the pawl is released from the cogs. The rotating plate is thereby allowed to rotate. The checking lever is pivoted at a point nearer the first leg than the second, such that relatively small movement of the first leg provides relatively large movement of the second leg.

This arrangement enables a cassette with an endless tape to be used on a tape recorder adapted for use with both takeup and play-out reels. Furthermore, since the pawl engages the cogs of the rotating plate, the tape cannot be damaged by mistakenly placing the cassette on the recorder when the recorder is rotating in the wrong direction. Also, by pivoting the checking lever near the first leg thereof, a relatively small force may be employed to release the rotating plate when the cassette is properly positioned on the recorder.

Other features of the invention will be made clear by the following description taken together with the accompanying drawings.

Figure 1:
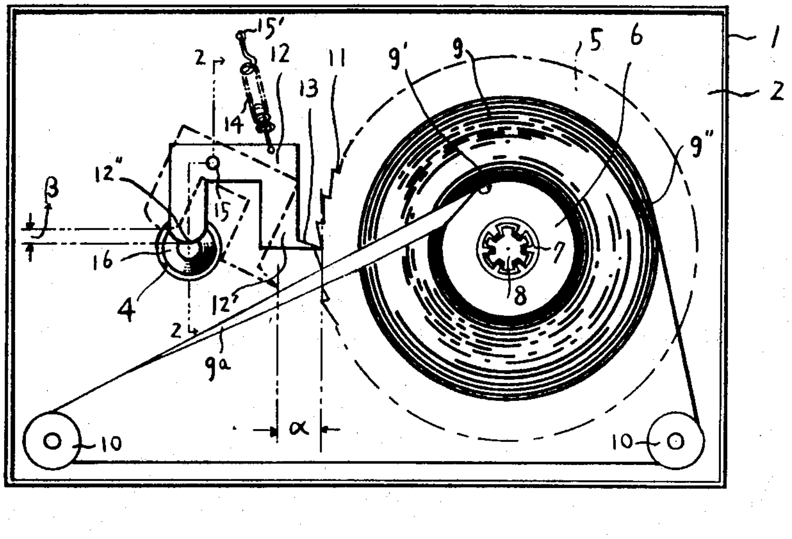
FIG. 1 is a plan view of the endless magnetic tape cassette of the present invention.
Figure 2:
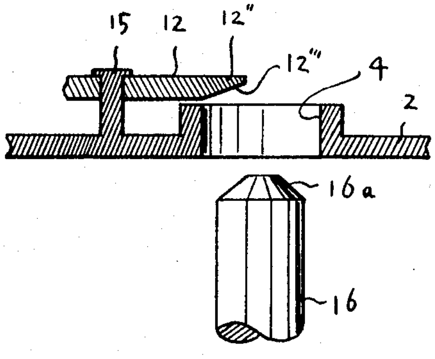
FIG. 2 is a cross-sectional view taken along line 2–2 of FIG. 1.

Referring now to the drawings, the cassette of the present invention includes a casing 1 of suitable material, such as a resin, and having a bottom wall 2. Wall 2 has two axis holes. The first of these is not shown, but receives a first rotating spindle 8 of a tape recorder. The spindle 8 acts as an actuating rod to rotate rotating plate 5. Rod 8 is splined to fit in splines 7 of a hub 6 of rotating plate 5. The endless magnetic tape is wound around hub 6 to form endless reel 9. A portion 9*a* of the reel is drawn out from the innermost radius 9′, around rollers 10 and past a recording head of the tape recorder, not shown in the drawings. From the recording head and rollers, the tape is rewound at the outermost radius 9′ of the endless reel.

The second axis hole 4 is adapted to receive a second spindle 16 of the tape recorder. This spindle operates as a holding pin. A generally U-shaped checking lever 12 is pivoted to wall 2 as at 15. A first leg 12″ of lever 12 is positioned above hole 4. A second leg 12′ of lever 12 has a pawl 13 thereon which is adapted to engage cogs 11 around the periphery of rotating plate 5. The under surface of first leg 12″ is tapered as at 12‴ to cooperate with the tapered edge 16*a* of holding pin 16. A spring 14 is connected between lever 12 and pin 15′ to urge lever 12 to the solid-line checking position shown in FIG. 1.

If the cassette is positioned on a tape recorder having one rotating spindle and one stationary spindle, the stationary spindle operates as a holding pin 16. When the rotating plate rotates in the proper direction, lever 12 is moved against the force of spring 14 by the movement of the cogs against the pawl.

As the cassette is positioned on the tape recorder having two rotating spindles, pin 16 rotates and urges lever 12 against the force of spring 14 from the solid-line checking position to the dashed-line released position shown in FIG. 1. Lever 12 is pivoted at 15 nearer to first leg 12″ than to second leg 12′. In FIG. 1, $\alpha$ represents the variation in position of leg 12′ from a contact line where pawl 13 contacts cogs 11 to a line parallel to the contact line to where pawl 13 swings. Also in FIG. 1, $\beta$ represents the variation in position of leg 12″ from a first line through the end of the leg when the pawl engages the cogs to a parallel line through the end of the leg 12″ when in its pivoted position. Since pivot 15 is closer to 12″ than 12′, the relationship between $\alpha$ and $\beta$ is always such that $\alpha>\beta$. Therefore, only a relatively minor force is required to be applied to 12″ to cause it to be displaced a small amount to result in a relatively large displacement of 12′.

By the above novel arrangement, it will be seen that when the cassette is placed on the tape recorder, if spindle 8 is mistakenly rotating in the wrong direction, pawl 13 will prevent rotating plate 5 from rotating. And therefore, the tape will not be forced between hub 6 and reel 9 and be damaged. Furthermore, it will be seen that the cassette of the present invention may be used on conventional reel to reel tape recorders. Also, production costs are reduced by the simple construction of the device.

Although two embodiments of the invention have been described in detail, such description is intended to be illustrative only, and not restrictive, since many details of construction of the invention may be altered or modified without departing from the spirit or scope of the invention.

What we claim is:

1. An endless tape cassette for use on a tape recorder having first and second spindles, said cassette comprising a casing having first and second axis holes in the bottom wall thereof adapted to receive said first and second spindles, respectively; a rotating plate having a hub thereon and adapted to fit over said first spindle, said endless tape adapted to be wound around said hub to form an endless reel, said rotating plate having cogs around the periphery thereof; a generally U-shaped checking lever having first and second legs, said lever being pivoted to said casing at a point closer to said first leg than to said second leg, said second leg having a pawl on the end thereof for engagement with said cogs, said first leg having a tapered under surface for engagement with a tapered edge of said second spindle of said tape recorder; and spring means for biasing said lever such that said pawl engages said cogs, whereby when said cassette is placed on or removed from said tape recorder the engagement of said pawl and said cogs prevents said tape from being wound onto said hub backwards and thereby being damaged.

2. An endless tape cassette as claimed in claim 1, wherein said first spindle rotates and said second spindle is stationary.

3. An endless tape cassette as claimed in claim 1, wherein both of said spindles rotate.